Aug. 13, 1935.　　M. E. HENNING　　2,011,220
REGULATOR VALVE
Filed April 11, 1932
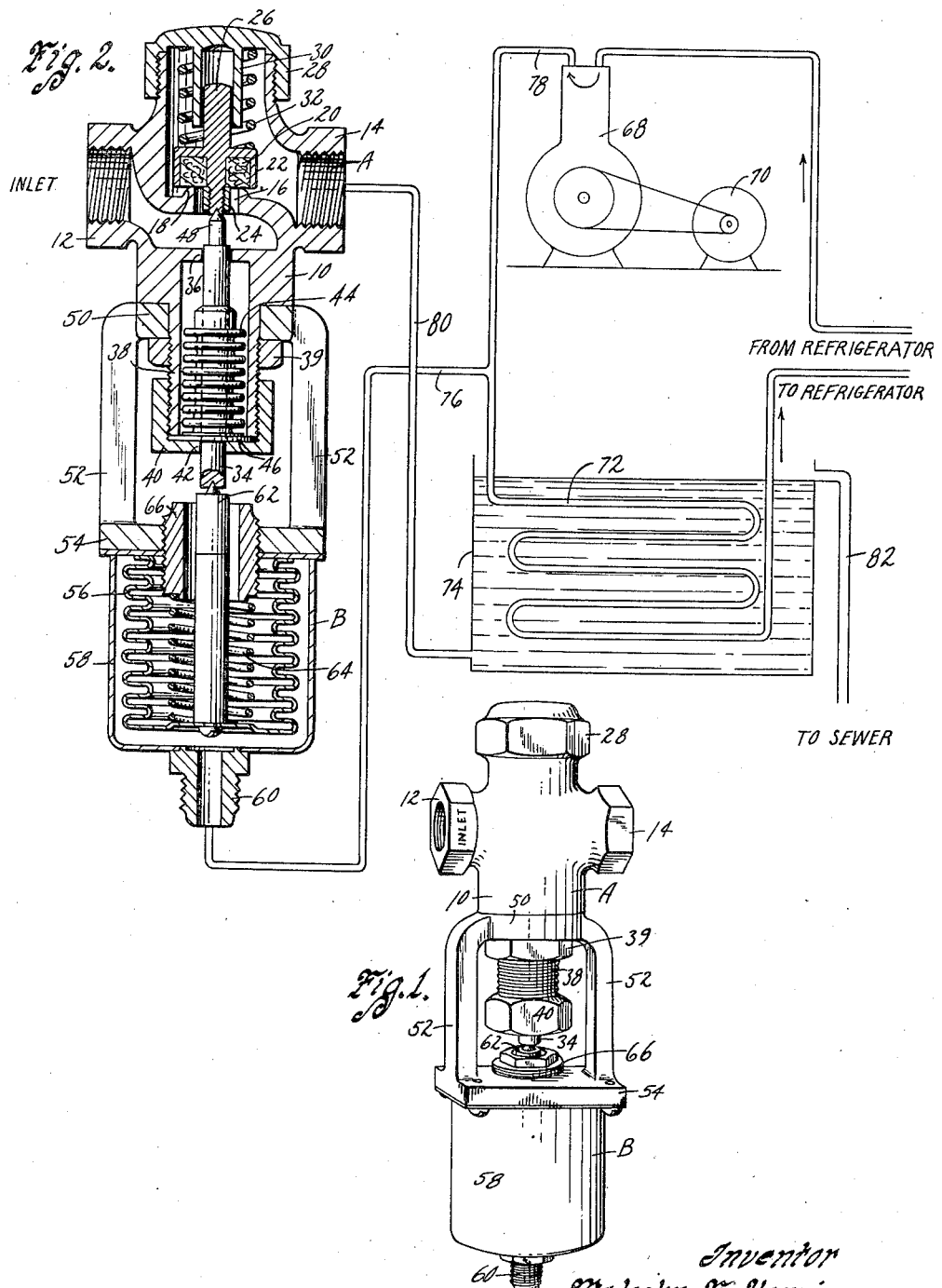

Patented Aug. 13, 1935

2,011,220

UNITED STATES PATENT OFFICE 2,011,220

REGULATOR VALVE

Malcolm E. Henning, Des Moines, Iowa, assignor to Penn Electric Switch Co., Des Moines, Iowa, a corporation of Iowa Application April 11, 1932, Serial No. 604,556

1 Claim. (Cl. 137—153)

An object of my invention is to provide an automatic water regulator valve especially designed for cooling water of a mechanical refrigeration system, the valve being comparatively simple and inexpensive, yet efficient in its operation.

A further object is to provide a valve automatically operable to cause flow of cooling water while the refrigerant compressor is in operation and stop the flow of such water when the refrigerating machine stops operating.

A further object is to provide a valve which admits varying quantities of water to the cooling system dependent upon surrounding atmospheric temperature so that in warm weather greater cooling water flow is had than in cold weather, thus automatically compensating for temperature changes without the necessity of manual attention.

A further object is to provide a valve which operates efficiently at all pressures of the cooling water supplied to the valve so that the water supply does not affect the valve to cause a different flow of water therethrough at different pressures.

More particularly, it is my object to provide a cooling water valve in which a frictionless packing is installed with the effective area of the packing and of the valve seat being substantially equal so that the action of the valve is not affected by varying water pressures.

Another object is to provide a valve of the character used for cooling water of refrigerant systems in which a valve member is provided which is of rubber or similar resilient characteristics and which therefore prevents leakage, such as frequently occurs with all metal valves since the rubber closes around any particles of scale or foreign matter which might lodge on the valve seat.

Another object is to provide for easy removal of the resilient valve member when necessary.

With these and other objects in view my invention consists in the construction, arrangement and combination of the various parts of my device, whereby the objects contemplated are attained as hereinafter more fully set forth, pointed out in the claim, and illustrated in the accompanying drawing, in which:—

Figure 1 is a perspective view of a cooling water valve embodying my invention.

Figure 2 is a longitudinal sectional view therethrough, showing the valve diagrammatically connected with a refrigeration system.

On the accompanying drawing I have used the reference character A to indicate generally a water cooling valve, and B a pressure responsive means for automatically operating the valve. The valve A includes a body 10 having inlet and outlet bosses 12 and 14 adapted to be connected with piping. Between the bosses 12 and 14 a valve seat opening 16 is formed which is surrounded by a valve seat 18.

Normally seated on the valve seat 18 is a valve member 20 of rubber or similar resilient material. The valve member 20 is contained in a cup-like member 22, a nut 24 being used to retain the valve member 20 in the member 22.

The member 22 is provided with an extension 26. A nut 28 is threaded on the valve body 10 and is provided with a sleeve 30 to slidably receive the extension 26. A spring 32 is interposed between the nut 28 and the member 22 to serve the purpose of retaining the valve member 20 seated against the seat 18. It will be noted that the valve opens with the pressure of water supplied to the inlet 12 and closes against such pressure so that all possibility of the water pressure serving to slap the valve shut is eliminated.

A valve stem 34 is provided for opening the valve member 22. The stem 34 slidably extends through an opening 36 of a partition within the body 10, the opening being a loose working fit to allow equalization of water pressure above and below the partition. A boss 38 is formed on the valve body 10 and is capped with a nut 40. The nut 40 is provided with an opening 42 through which the valve stem 34 slidably extends.

Within the boss 38 I provide a bellows member 44 having its upper end brazed or otherwise sealed relative to the valve stem 34 and its lower end brazed or otherwise secured to a washer 46. The washer 46 is confined between the boss 38 and the nut 40, gaskets being provided at this point if found necessary. The upper end of the valve stem 34 is provided with a pointed reduced end 48 to engage the lower end of the container member 22.

From the construction of the parts just described, it will be obvious that the valve stem 34 is sealed relative to the valve body 10 by the bellows 40, the bellows serving to prevent leakage of water from the boss 38 around the stem 34.

It will be noted that the effective area of the bellows 34 is substantially equal to the effective area of the valve seat opening 16. This is very important as it serves to balance the valve since water under pressure exerts an upward push against the valve member 20, and a downward push against the bellows 44 and when these are equalized there is neither an opening nor a closing tendency of the water under pressure on the valve. Thus, it will be obvious that regardless of whether the water pressure is high or low, the valve will operate the same.

On the boss 38 I provide a ring 50 held in position by a nut 39. The ring 50 is provided with a pair of arms 52 terminating in a plate 54.

The pressure responsive means B comprises a bellows 56 within a casing 58, the casing having a fitting 60 for connection with a pressure pipe. A pin 62 has one end connected with the head of the bellows 56 and its other end engaged with the valve stem 34. Within the bellows 56 a spring 64 is mounted and an adjusting nut 66 engages one end of the spring for adjusting its tension as found necessary.

It will be obvious that pressure within the casing 58 surrounding the bellows 56 will tend to collapse the action of the bellows 64 and upon the valve 20 against the action of the spring 32. The amount of opening of the valve will be in proportion to the pressure exerted within the casing 58 except that when such pressure reaches a pre-determined high value the valve container 22 will engage the sleeve 30 and thereafter the valve will remain in such predetermined wide open position.

In Figure 2 I have shown a refrigerant compressor 68 operated by a motor 70. I have also shown a condenser coil 72 submerged in cooling water in a tank 74. A pipe line 76 extends from the fitting 60 of the pressure responsive device B to the outlet or high pressure pipe 78 of the refrigerant compressor 68. A pipe 80 connects the outlet 14 of the valve A with the tank 74 for supplying cold water thereto, heated water therefrom being discharged through an overflow pipe 82.

In operation, assuming the refrigerant compressor 68 idle, the pressure in the pipes 76 and 78 will be lowered so that the valve will be seated as shown in Figure 2. When the motor 70 is energized and the compressor 68 commences to operate, pressure will be built up in the pipes 76 and 78 and in the casing 58 surrounding the bellows 56. This will cause the valve 20 to be opened, the degree of opening increasing with the building up of pressure. This will at first admit water slowly to the tank 74 and admit it at an increased rate of flow as the compressor 68 continues to operate and additional cooling water is required to properly cool the condensing coil 72. Since the valve is of balanced construction, the valve will operate at best efficiency regardless of the pressure of the water supplied thereto.

My valve is superior to the magnet or solenoid operated types, which are either fully open or fully closed. For instance, in warm weather it is necessary to manually adjust the magnetic type of valve to allow greater flow, and in cold weather it must be manually adjusted to prevent undue waste of water. With my valve, however, in warm weather the refrigerant being warmer will build up a high pressure in the casing 58 and open the valve wider, while in cold weather there will be lower refrigerant pressure which prevents wide opening of the valve.

By providing a bellows 44 in place of a packing, I entirely eliminate leakage and provide minimum friction which will not change throughout years of operation. Consequently frequent adjustments of the spring pressure such as would be necessary if a packing gland were used and packing and repacking trouble are entirely done away with. A much closer operating differential is had because of the reduction of friction to a minimum and long life of the valve is insured.

Some changes may be made in the construction and arrangement of the parts of my device without departing from the real spirit and purpose of my invention, and it is my intention to cover by my claim, any modified forms of structure or use of mechanical equivalents, which may be reasonably included within their scope.

I claim as my invention:—

In a valve structure, a valve body having an inlet and an outlet, a seat between said inlet and said outlet, a bellows casing extending downwardly from said body, the interior of said bellows casing being subject to pressure of liquid in said inlet, the lower end of said bellows casing being open, a yoke secured to said bellows casing and having a head spaced therefrom, a pressure responsive bellows mounted on said head, a valve stem having its lower end connected with said bellows, said stem extending through said head and said bellows casing, a valve plug operatively connected with the upper end of said stem and associated with said valve seat to seat thereagainst upon downward movement of the valve stem and to be unseated therefrom upon upward movement of the stem, a sealing bellows of substantially the same effective area as the area of said valve seat, the upper end thereof being sealed relative to said valve stem and a closure member for the open end of said bellows casing, said closure member being operable to seal the lower end of said sealing bellows relative to said bellows casing.

MALCOLM E. HENNING.